United States Patent
Khosravi et al.

[19]

[11] Patent Number: 6,061,088
[45] Date of Patent: May 9, 2000

[54] SYSTEM AND METHOD FOR MULTI-RESOLUTION BACKGROUND ADAPTATION

[75] Inventors: Mehdi Khosravi; Michael C. Moed, both of Roswell; Ralph N. Crabtree, Atlanta; Jorge E. Perez-Jacome, Smyrna, all of Ga.

[73] Assignee: NCR Corporation, Dayton, Ohio

[21] Appl. No.: 09/009,167

[22] Filed: Jan. 20, 1998

Related U.S. Application Data

[60] Provisional application No. 60/050,972, Jun. 19, 1997.

[51] Int. Cl.[7] .................................................. H04N 5/225
[52] U.S. Cl. ........................... 348/169; 348/586; 348/700
[58] Field of Search ..................................... 348/169, 584, 348/586, 578, 700, 576, 575; 382/103, 282

[56] References Cited

U.S. PATENT DOCUMENTS

| | | | |
|---|---|---|---|
| 5,046,165 | 9/1991 | Pearman et al. | 348/590 |
| 5,264,933 | 11/1993 | Rosser et al. | 348/578 |
| 5,268,580 | 12/1993 | He | 250/566 |
| 5,280,530 | 1/1994 | Trew et al. | 382/103 |
| 5,566,251 | 10/1996 | Hanna et al. | 382/284 |
| 5,731,846 | 3/1998 | Kreitman et al. | 348/581 |
| 5,788,675 | 8/1998 | Mayer | 604/167 |
| 5,809,161 | 9/1998 | Auty et al. | 382/104 |
| 5,852,672 | 12/1998 | Lu | 382/154 |
| 5,923,365 | 7/1999 | Tamir et al. | 348/169 |
| 5,940,139 | 8/1999 | Smoot | 348/584 |
| 5,953,055 | 9/1999 | Huang et al. | 348/155 |
| 5,953,076 | 9/1999 | Astle et al. | 348/584 |

*Primary Examiner*—Vu Le
*Attorney, Agent, or Firm*—Needle & Rosenberg

[57] ABSTRACT

A multi-resolution background adaptation system and method wherein image information for a video frame is analyzed to update a background image in as great a resolution as possible. The video frame is partitioned into a plurality of cell levels, each cell level comprising at least one cell. Each cell is further partitioned into children cells for several hierarchical levels. Background image adaptation begins at the frame level and proceeds to lower cell levels of smaller cells when the lower cell levels are not substantially occluded by objects.

37 Claims, 9 Drawing Sheets

SYSTEM AND METHOD FOR MULTI-RESOLUTION BACKGROUND ADAPTATION

CROSS-REFERENCE TO RELATED APPLICATION

This application claims the benefit of U.S. Provisional Application Ser. No. 60/050,972 filed Jun. 19, 1997.

BACKGROUND OF THE INVENTION

1. Field of the Invention

The present invention generally relates to a system and method for updating background image information of a viewing area, and more specifically, to a multi-resolution background adaptation system and method.

2. Description of the Prior Art

In conventional background adaptation schemes, adaptation of a background image occurs when no activity in an entire video frame is detected. One well known approach to background adaptation is frame averaging. In this prior art method, an average of a number of input image frames is computed and used as the background image. Background adaptation based on averaging methods provide only a crude estimate of the background and do not consider the presence of moving objects in the scene. In addition, averaging is not applicable to situations in which people or objects stay in a scene for a long period of time. Moreover, averaging techniques are computationally expensive because they involve computing an average for each pixel for a plurality of image frames.

Other prior art background adaptation methods detect a sufficiently long period of time without motion in the entire frame to determine that the object has become part of the background, and then copy it into the background image. In some situations, it is difficult to determine when a video frame definitely represents the background, that is, image information for a video frame without any objects occluding parts of the background. Using the techniques of the prior art, it cannot be accurately determined whether or not an object brought into the viewing area is to become part of the actual background image information. In highly active viewing areas or scenes, a long period of no-activity is unlikely to occur. Consequently, image information associated with the object may erroneously not be incorporated into the background image.

What is needed is a background adaptation system and method which can adapt portions of a background image independently of activity in other portions of it so as to more accurately update a background image.

SUMMARY OF THE INVENTION

Briefly, the present invention is directed to a system and method for background adaptation of image information representing a scene or viewing area monitored by a video camera. A region or portion of a video frame is selected for analysis. The image information for smaller subregions within that region are analyzed to determine whether any subregion is substantially occluded by an object. If a portion of the region (at least one of the subregions) is substantially occluded by an object, then the background image frame is updated for the region. If none of the subregions is substantially occluded by an object, then each of the subregions is analyzed individually in the same manner. This process is repeated recursively for smaller and smaller regions.

The objects and advantages of the present invention will become more readily apparent when reference is made to the following description taken in conjunction with the accompanying drawings.

DETAILED DESCRIPTION OF THE INVENTION

Figure 1:
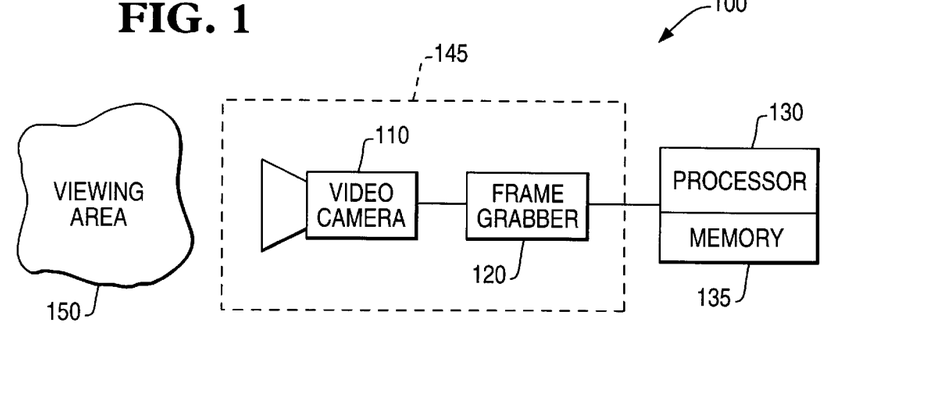
FIG. 1 is a block diagram showing the basic hardware components of the background adaptation system according to the present invention.

Referring first to FIG. 1, the hardware components of the background adaptation system 100 according to the present invention are shown. The hardware components of the background adaptation system are standard off-the-shelf components. The primary components in the system are one or more video cameras 110, one or more frame grabbers 120, and a processor 130, such as a personal computer (PC), having a memory 135 which stores software programs for controlling the processor 130. The combination of the video camera 10 and frame grabber 120 may collectively be referred to as an "image acquisition module" 145. The frame grabber 120 receives a standard video signal output by the video camera 110, such as a RS-170, NTSC, CCIR, or PAL video signal, which can be monochrome or color. In a preferred embodiment, the video camera(s) 110 are mounted or positioned to view a selected viewing area or scene 150 of interest, such as a checkout lane in a retail establishment, an automated teller machine (ATM), an entrance, an exit, or any other localized area where people may move and/or interact with devices or other people.

The frame grabber 120 is embodied, for example, by a Meteor™ Color Frame Grabber, available from Matrox. The frame grabber 120 operates to convert the analog video signal into a sequence or stream of digital video frame images that are stored within the memory 135, and processed by the processor 130. For example, in one implementation, the frame grabber 120 converts the video signal into a 320×240 NTSC) or 768×576 (PAL) color image, or in general a W×L image defining a single video frame of video information. A variety of other digital image formats and resolutions are also suitable, as will be recognized by one of ordinary skill in the art. Each pixel of a video frame has a predetermined bit resolution, such as 8 bits, and color data may be used to increase system performance.

Figure 2:
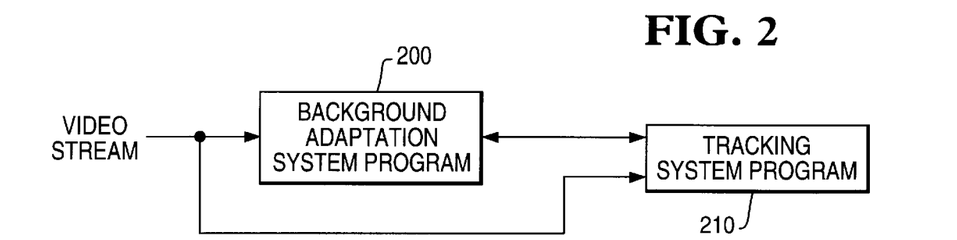
FIG. 2 is a block diagram showing use of the background adaptation system with a tracking system.

Referring to FIG. 2, the background adaptation functionality is implemented by a background adaptation system program 200 stored in the memory 135 of processor 130. The background adaptation system program 200 may be installed in the memory 135 from another memory/storage medium, such as a CD-ROM, floppy disk(s), hard disk, etc., or it may be downloaded from an Internet site, or from an on-line service for installation into the memory 135. The background adaptation program 200 comprises a plurality of executable instructions which, when stored in the memory 135, cause the processor 130 to the processes depicted in FIGS. 5–11. However, one with ordinary skill in the art will appreciate that the background adaptation functionality could be implemented by one or more application specific integrated circuits, a digital signal processor or other suitable signal processing architectures. The background adaptation system program 200 comprises several software modules, as will be explained hereinafter. Background image information generated by the background adaptation system program 200 is supplied to, for example, a tracking system 210 to track people, objects, etc., within the viewing area 150 of the video camera 110. In some cases, the tracking system program 210 includes software modules which supply certain information to the background adaptation system program 200 that are used to determine background information, as will be explained hereinafter.

Figure 3:
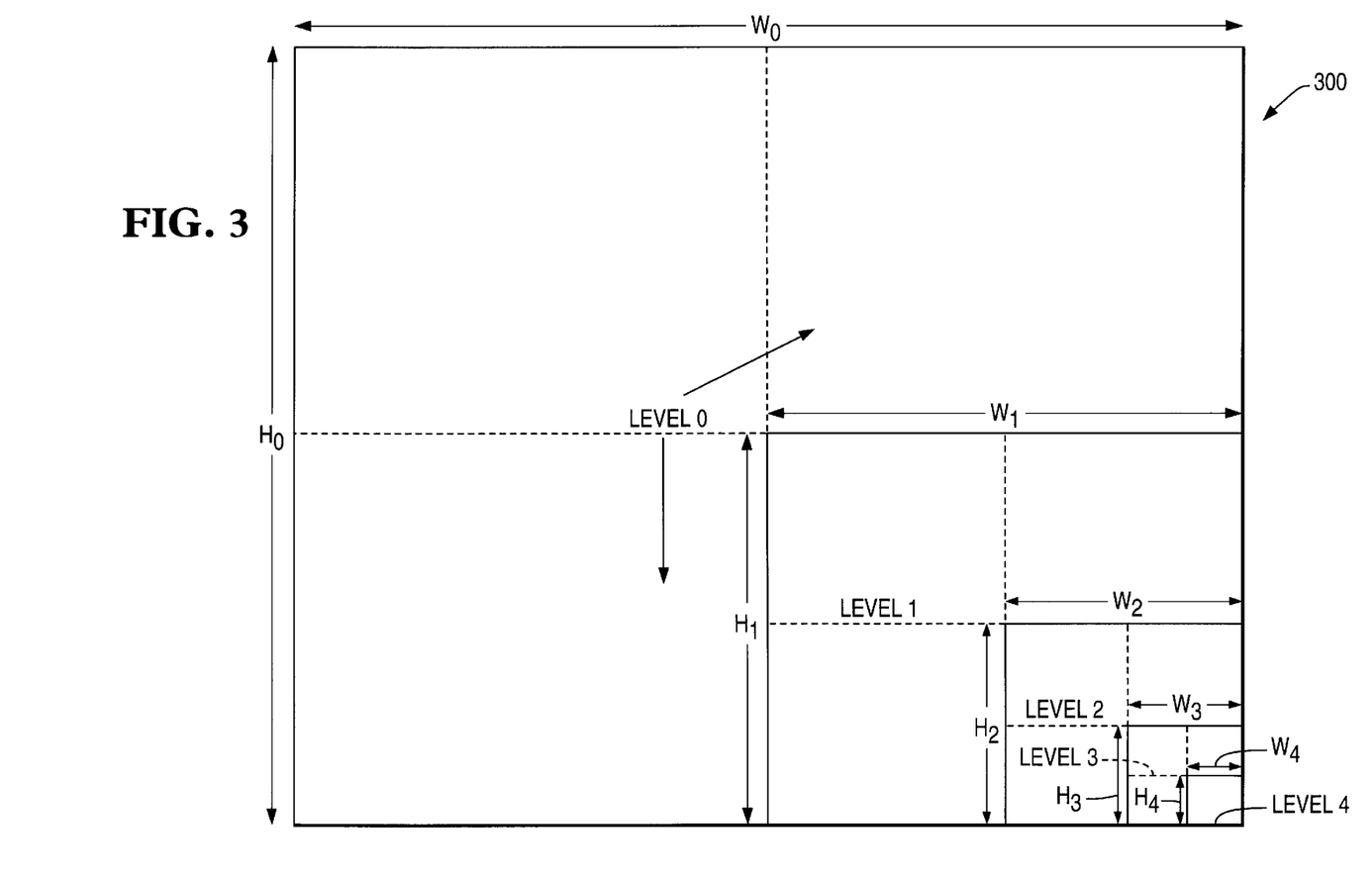
FIG. 3 is a graphical representation showing how a video frame is partitioned into multi-resolution cell levels in accordance with the present invention.

Turning now to FIG. 3, the manner in which the multi-resolution background image information operates on a video frame 300 will be described. The video frame 300 comprises a predetermined number of pixels, W×H, and is partitioned into different cell resolutions called "cell levels". The entire frame is the highest cell level and is called Level 0, and is $W_0 \times H_0$ pixels in resolution, corresponding to the pixel resolution of one video frame. Each cell level is further partitioned into a plurality of constituent or "children" cells at the next lower cell level. For example, Level 0 has 4 (four) children cells at Level 1; Level 1 is $W_1 \times H_1$ and each Level 1 cell has 4 children cells at Level 2; Level 2 is $W_2 \times H_2$ and each Level 2 cell has 4 children cells at Level 3; Level 3 is $W_3 \times H_3$ and each Level 3 cell has 4 children cells at Level 4. Level 4 is $W_4 \times H_4$ and is the lowest level and thus the Level 4 cells do not have children cells. The number of cell levels and the number of children cells for each cell is variable depending on a particular application. The term "children" cells used hereinafter means the direct children cells of a particular cell. The terms "descendants" or "descendant cells" means all of the constituent cells within the boundaries of a particular cell down to the lowest cell level.

For a video frame which is 320×240 pixels, one possible resolution breakdown is shown by the chart below.

| Level | Size (pixels) | # of Children | # of Cells Total (at Current Level) |
| --- | --- | --- | --- |
| 0 | 320 × 240 | 4 | 1 |
| 1 | 160 × 120 | 4 | 4 |
| 2 | 80 × 60 | 4 | 16 |
| 3 | 40 × 30 | 4 | 64 |
| 4 | 20 × 15 | 0 | 256 |

The resolution increases from cell Level 0 to cell Level 4.

The background adaptation system program generates and operates on various parameters associated with each cell, some of which are constant and others which are dynamic.

The parameters for each cell, some of which are explained in more detail hereinafter are:

Level The level of the cell.
Width The width of the cell.
Height The height of the cell.
NumChildren Number of children cells that the cell has. It is 0 for Level 4 cells; otherwise it is 4 in the example described above.
Children A list of children cells for a particular cell.
NumBlobPixelsOverlap The number of pixels of the cell overlapped or occupied by image blobs representing an object or objects.
BlobOverlapFrac The fraction of pixels in a cell overlapped or occupied by image blobs divided by the total number of pixels in the cell.
BGDiffPixCount The number of pixels in the cell of a current video frame that are different from the corresponding cell in the background image frame.
BGDiffFrac The fraction of pixels different from the corresponding cell in the background image frame divided by the total number of pixels for the cell.
RetainStartTime The time at which the cell in the reference frame was last changed.
LastStaticSceneTime The last time the image information for the current cell did not exhibit motion.

Figure 4:
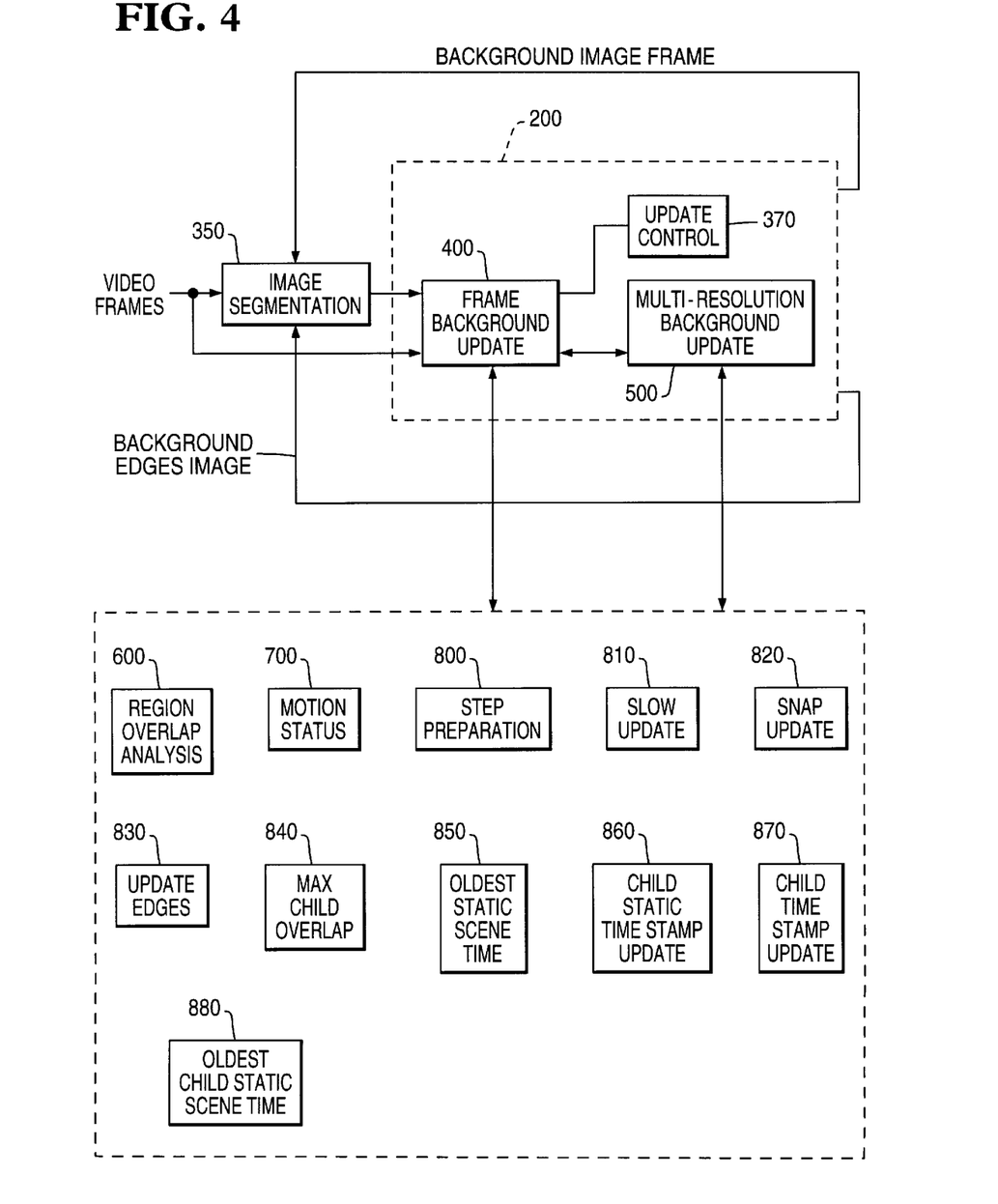
FIG. 4 is a block diagram showing the software modules of the background adaptation system according to the present invention.

The general organization of the background adaptation system program 200 is shown in FIG. 4. The background adaptation system program 200 is closely associated with an image segmentation module 350. The image (or region) segmentation module 350 uses background image information generated by the background adaptation system program 200 to extract regions of an image frame in the scene or viewing area that are likely to correspond to objects or people, and which are not part of the background image. The image segmentation module 350 generates two pieces of information used by the background adaptation system program: image region or blob information potentially representing objects, people, etc., in the scene with respect to the background image, and a background difference frame representing a difference between a current video frame and the background image. The current video frame is supplied from the video acquisition module 145. The background adaptation system program 200 generates and updates the background image frame (hereinafter referred to as the background image) and generates a background edges image, both of which are used by the image segmentation module 350 to extract image blobs, etc. The background adaptation system program 200 is useful in a system that tracks persons in a scene, such as customer movement in a retail store, bank, etc.

The background adaptation system program 200 comprises a frame background update module 400 and a multi-resolution background update module 500. The frame background update module 400 performs frame-level background adaptation processing and determines when multi-resolution background update operations should be performed. An update control module 370 controls the frequency at which the background adaptation function is performed. The operations of the multi-resolution background update module 500 are called by the frame background update module 400.

Both the frame background update module 400 a nd the multi-resolution background update module 500 call upon the functions of several other software modules shown in the bottom half of FIG. 4. These other software modules include a region overlap analysis module 600, a motion status module 700, a step preparation module 800, a slow update module 810, a snap update module 820, an update edges module 830, a max child overlap module 840, an oldest static scene time module 850, a child static time stamp update module 860, a child time stamp update module 870 and an oldest child static scene time module 880.

The function of the background adaptation system program 200 is to update the contents of the background image frame. The background image frame is a frame of video image information which represents the current background of the scene or viewing area.

There are two modules which update the contents of the background image frame: the snap update module 820 and the slow update module 810. The snap update module 820 copies the content, that is, the information, for a particular cell of a current video frame into a corresponding cell in the background image frame, causing an immediate update of the background image frame with the contents of that cell. By contrast, under certain conditions it is desirable to more gradually update the contents of the background image frame. The slow update module 810 gradually changes the image information for a cell in the background frame toward that of the current cell over several background update cycles. This may involve increasing or decreasing the color planes of the image information inside the current cell by a step value and is performed for every pixel of the current cell, and may take several background update cycles depending on a step size. The value of the step size affects the rate of adaptation, where the smaller the step size, the slower the adaptation. The step size value is generated by the step preparation module 800. There are two step size parameters: SlowStepSize for slow updates and VSlowStepSize for very slow updates. Each is user programmable. When there is noisy activity in a cell in each adaptation cycle, the slow update module 810 increases/decreases the pixel values in the background image frame toward the corresponding pixel values of the current video frame.

In order to make the background adaptation process independent of the speed of the processor on which the program operates, the parameters for adaptation depend on time rather than any processor dependent variable. Moreover, pixel values can be changed only in discrete levels or increments. For this reason, the step preparation module 800 is called once per frame and outputs step values by which a pixel is to be changed when the slow update module 810 is called, using SlowStepSize or VSlowStepSize. A desired step size $R_N$ is computed by multiplying the time difference between the current time TS and the time of the previous update cycle TS(k−1). The step size Sx by which a pixel is to be changed at the current cycle is $Sx=Rn*\{TS(k)-TS(k-1n)\}+Sr(k-1)$, where the index k refers to the current cycle and k−1 refers to the previous cycle that the background adaptation function was called. The actual step used is Sa=int(Sx), and the residual, Sr(k)= Sx−Sa, is added on at the next background adaptation cycle.

In addition, the update edges module 830 updates the transitions or contrast gradients of the background image frame. There are many methods known that are suitable for updating the edges of an image. One such method is called the Sobel operation. A background edges image is created as output by the update edges module 830 and supplied as input to the image segmentation module 350.

Figure 5:
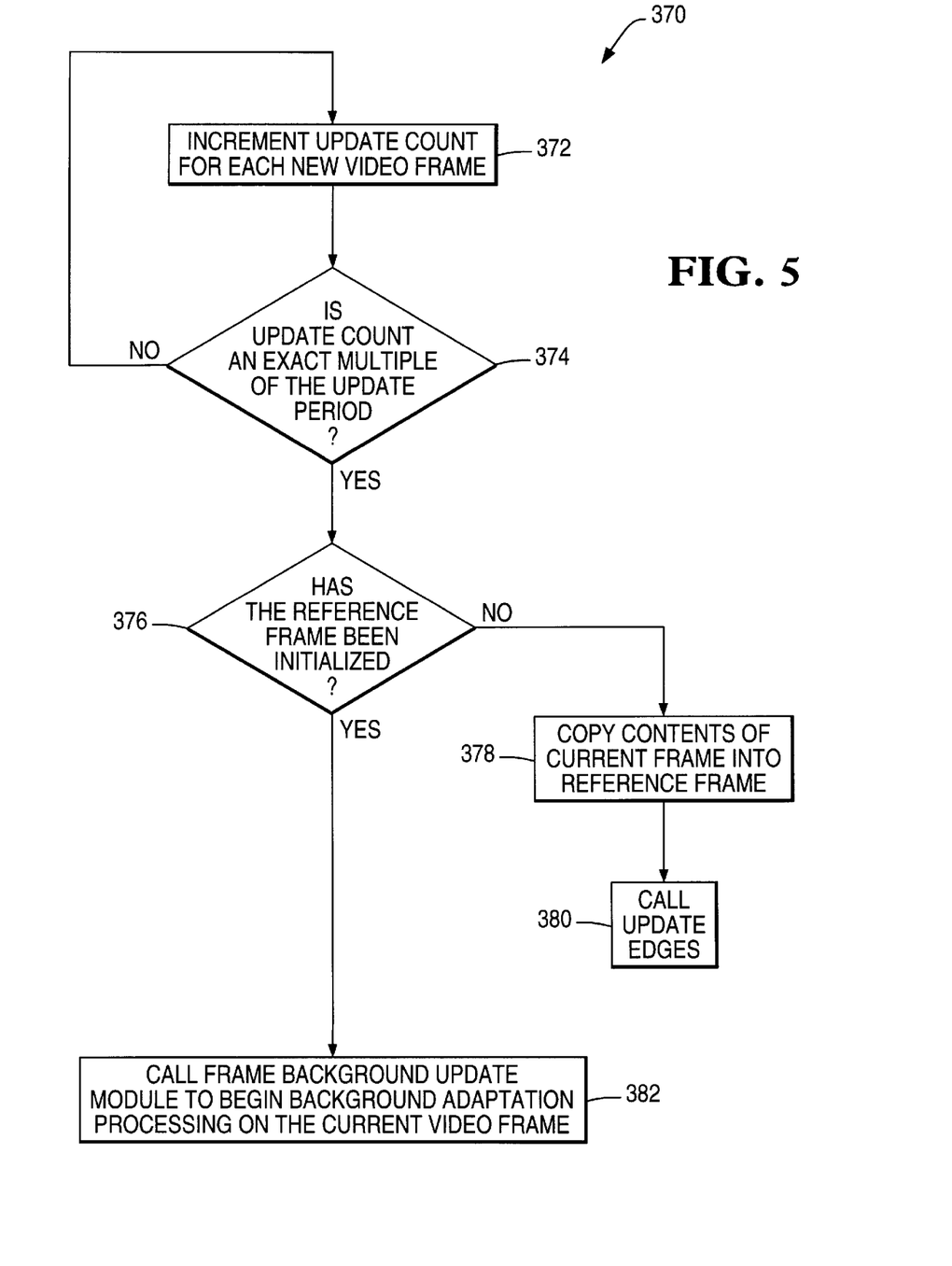
FIG. 5 is a flow chart showing the operation of an update control module for controlling at what frequency of video frames background adaptation is performed.

Referring to FIG. 5, the update control module 370 will be described. In step 372, a counter called update count is incremented for each new video frame. In step 374, the update count is compared with a user-programmable quantity called update period, and if the update count is an exact multiple of the update period, then the procedure continues. If not, the process returns to step 372. In step 376, it is determined whether the reference frame has been initialized for the first video frame in the operation of the background adaptation system program. If it has not, then in step 378, the contents of the current video frame is copied into the reference frame, and in step 380, the update edges module is called to update the edges information for the background image frame. In step 382, the frame background update module 400 is called to begin background adaptation processing on the current video frame. Thus, the background update cycles occur at a predetermined frequency of video frames depending on the value assigned to the update period quantity. The image information of the background image frame updated each background update cycle is stored in the memory 135, for example, and is coupled to the image segmentation module 350, as described above.

Figure 6:
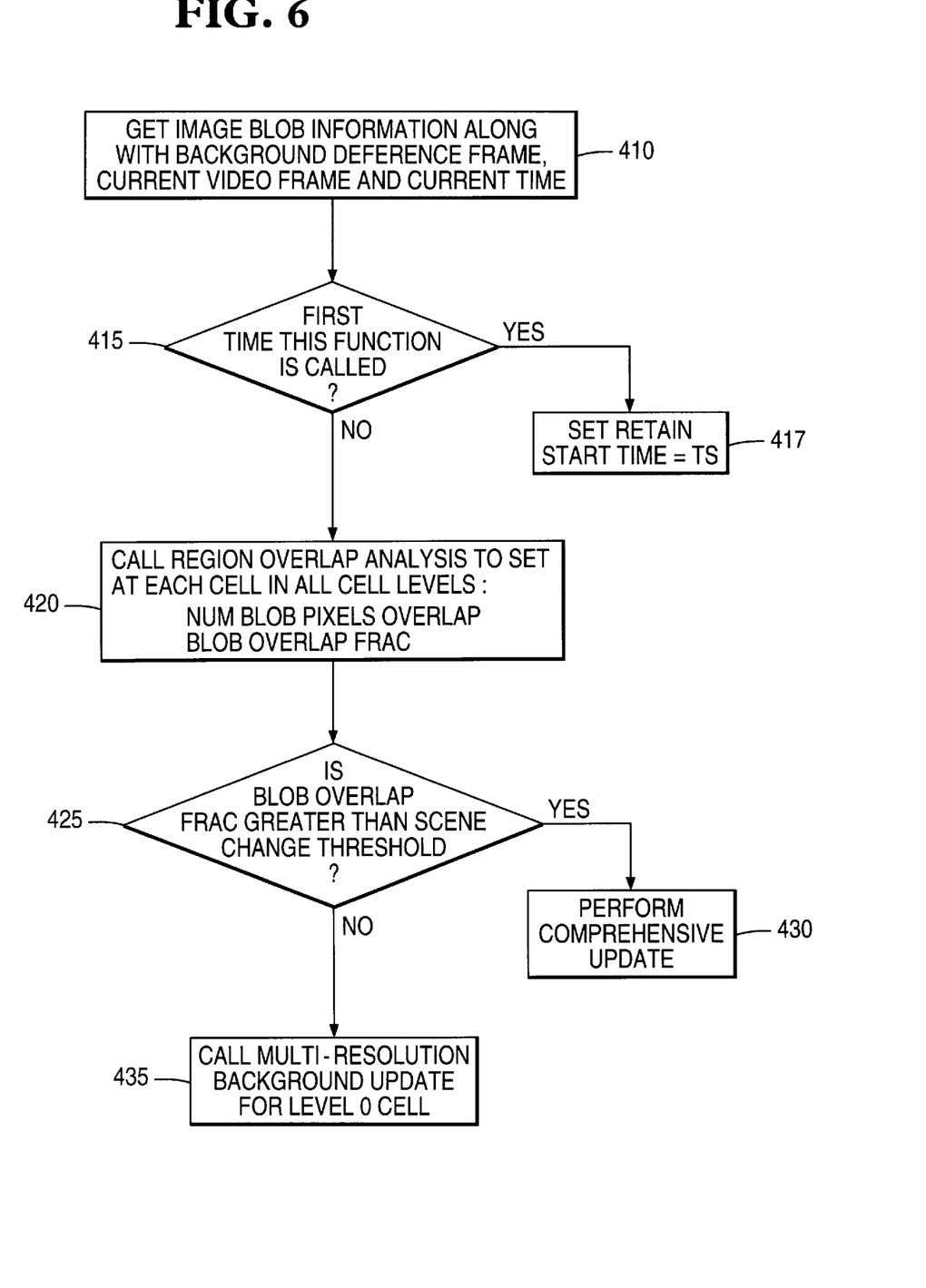
FIG. 6 is a flow chart showing the steps of the frame update background module.

Turning to FIG. 6, the frame background update module 400 will be described. This module is called at the start of a background update cycle. In step 410, for the current video frame, the image blob information, the background difference frame, the current video frame, and the current time stamp TS of the current frame are obtained from the image segmentation module 350 and from the stream of video frames supply by the video acquisition module. Next, in step 415, if it is the first time that the frame background update function is called, the RetainStartTime parameter is set to TS in step 417. Also, in step 417, a parameter called the previous time stamp, corresponding to TS(k−1) above is set equal to TS. In addition, the step residuals from the previous cycle, corresponding to Sr(k−1) are initialized (set equal to 0). Otherwise, in step 420 the region overlap analysis module 600 is called. At this point, the region overlap analysis module 600 determines, for all of the cells in all resolution levels, the number of pixels having values greater than a predetermined threshold indicating that they are occupied by image blobs based upon the image region or blob information supplied by the image segmentation module. This information is represented by NumBlobPixelsOverlap, and the fraction of the number of pixels occupied by image blobs relative to the total number of pixels in each cell is called BlobOverlapFrac.

Next, in step 425, a test is made to determine whether there is a substantial change in the scene. The parameter BlobOverlapFrac for the entire video frame (Level 0) is compared with a threshold called SceneChangeThreshold. If the BlobOverlapFrac is greater than the SceneChangeThreshold indicating a significant sudden or abrupt scene change has occurred since the last background update cycle, then in step 430, a comprehensive update is performed to adjust the background image frame for this sudden scene change. The comprehensive update includes: (1) setting the RetainStartTime parameter equal to the current time stamp TS for all cells using the Child Time Stamp Update module 870; (2) setting the LastStaticSceneTime parameter to TS for all cells using the Child Static Time Stamp Update module 860; (3) calling the snap update module 820 to copy the image information for the entire current frame into the background image frame; and (4) calling the update edges module 830. If, on the other hand, the BlobOverlapFrac for the Level 0 cell is not greater than the SceneChangeThreshold, then the multi-resolution background update module 500 is called in step 435.

The multi-resolution background update module starts with the largest cell (Level 0 cell) and continues to greater resolutions at the lower cell levels only if the lower cell levels are not substantially occluded by objects.

Figure 7:
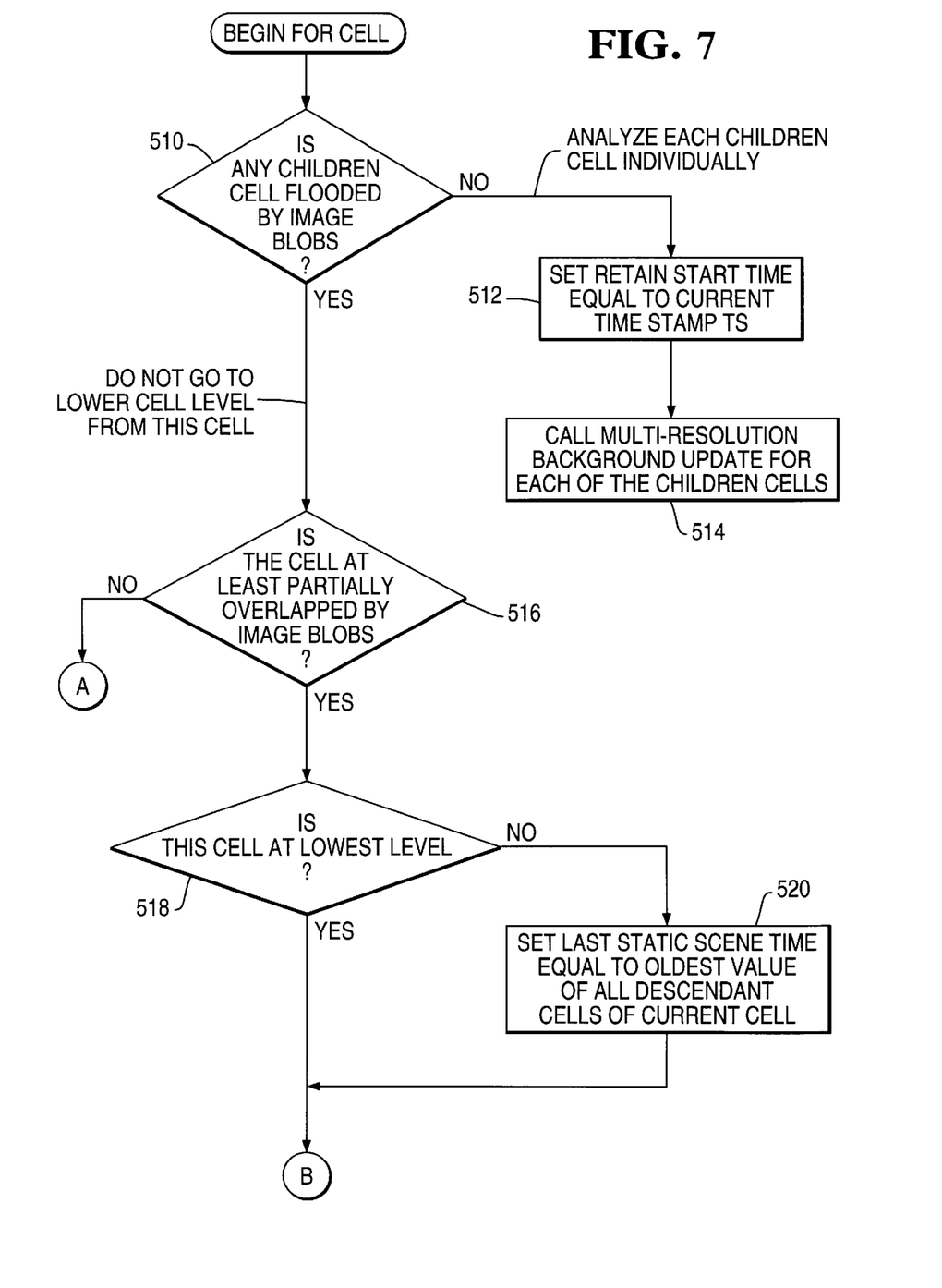
FIGS. 7–9 illustrate a flow chart for the steps of the multi-resolution background update module according to the present invention.
Figure 8:
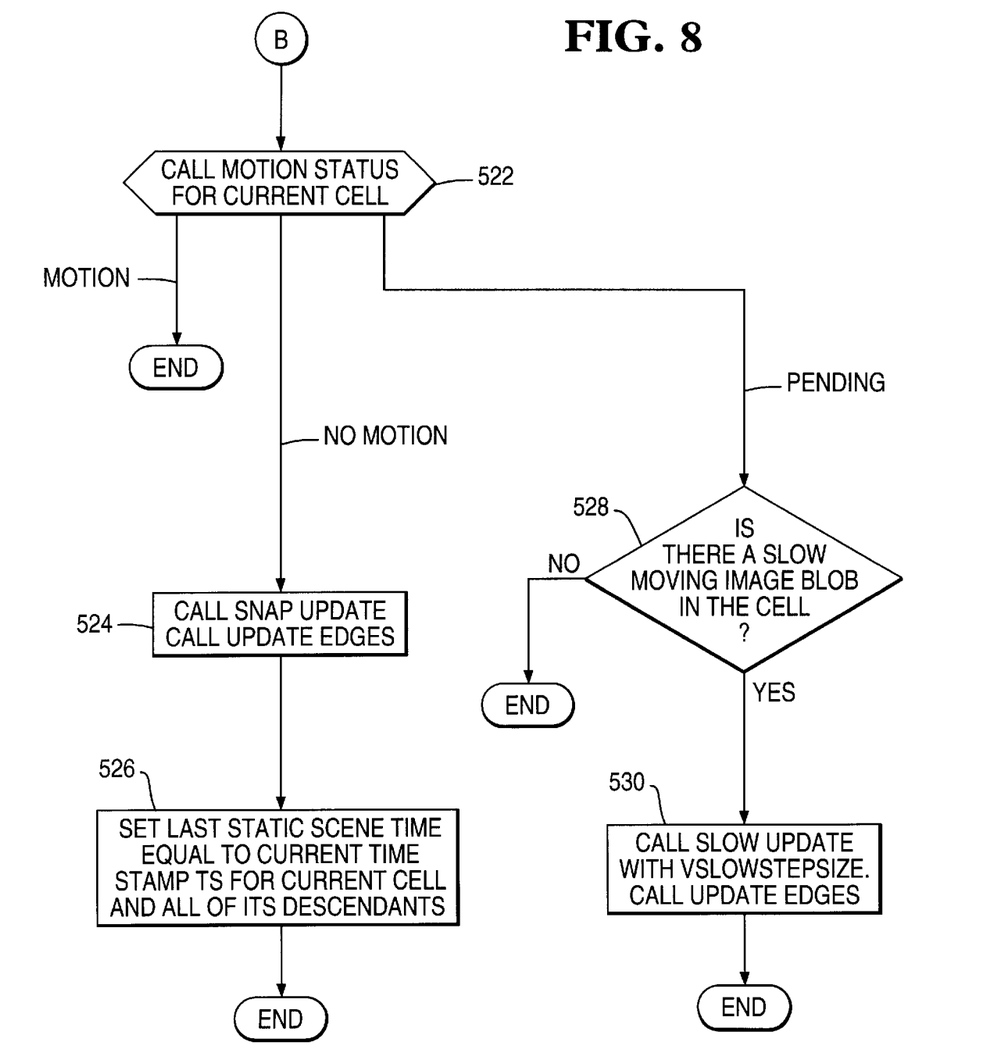
Figure 9:
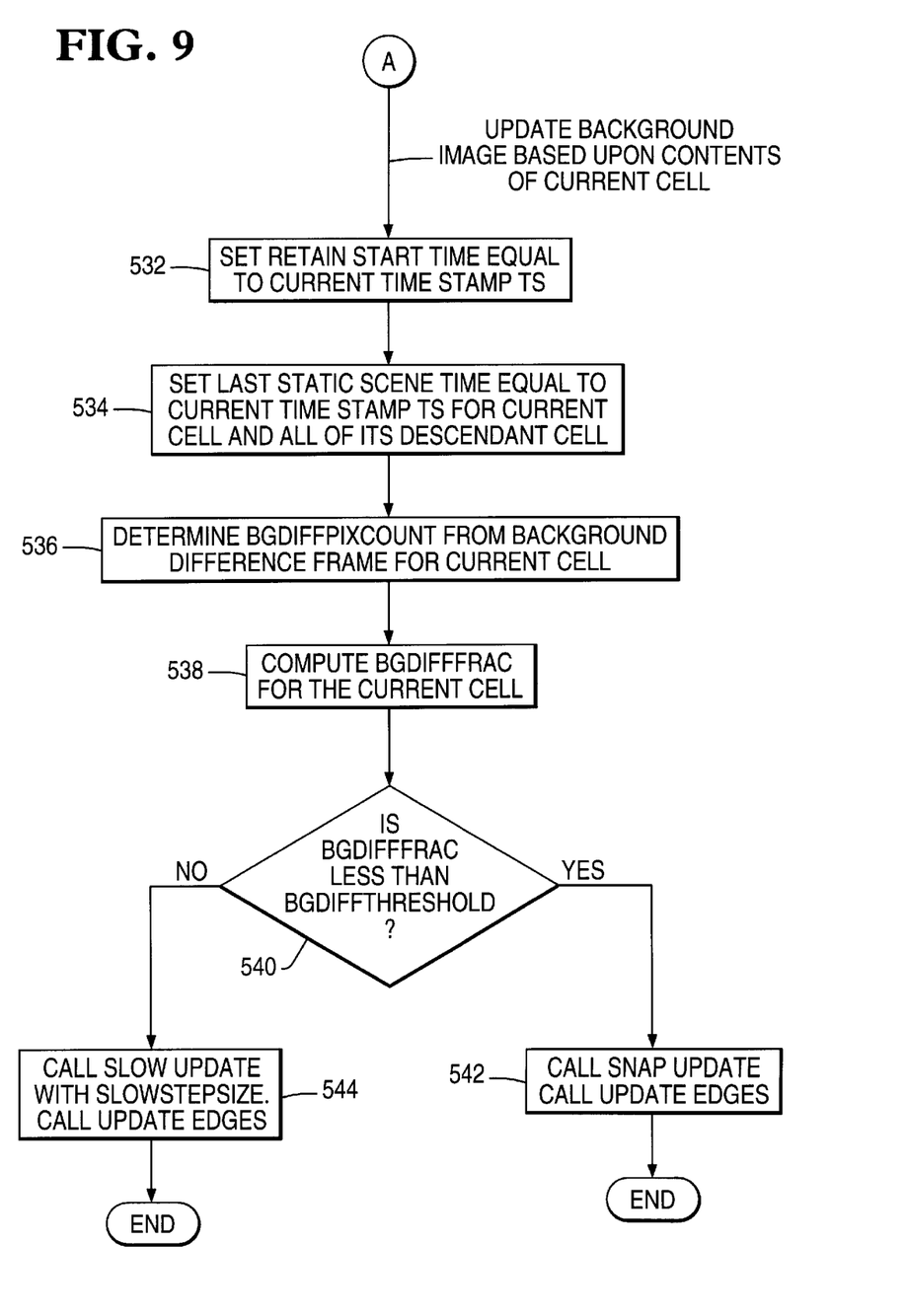

Turning to FIGS. 7–9, the operation of the multi-resolution background update module 500 will be described. Generally, the goal of the multi-resolution background update module 500 is to perform multi-resolution background adaptation to update the background image frame with image information at the smallest possible cell size. The expression "flooded by image blobs" means that the region under analysis is substantially occluded by an object or objects, and this test is performed by comparing a pixel overlap quantity for the cell with a threshold.

Figure 10:
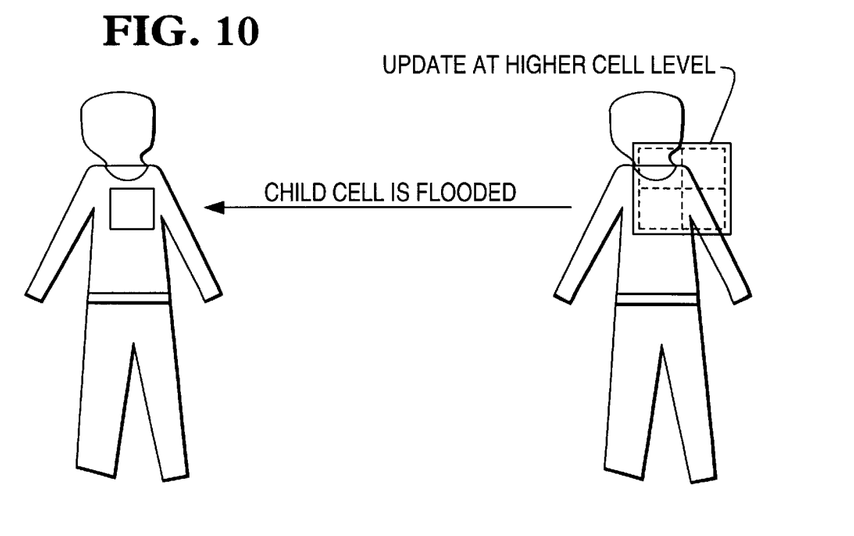
FIG. 10 is a diagram showing an example of multi-resolution background adaptation.

For example, as shown in FIG. 10, the larger cell in the image on the right has at least one child cell (shown in the image on the left) which is flooded by image blobs. It would not prove useful to update the background image at a cell level lower than that of the larger cell (shown on the right) because at least one child cell at the lower level is so occluded by the presence of the person, it would be difficult to detect motion of an object within it. Consequently, the background image frame will not be updated any lower than the cell level shown in the image on the right.

The general processing flow of the multi-resolution background update module is as follows. A region or portion of a video frame is selected for analysis. The image information for smaller subregions within that region are analyzed to determine whether any subregion is substantially occluded by an object. If a portion of the region (at least one of the subregions) is substantially occluded by an object, then the background image frame is updated for the region and the subregions are not analyzed individually. If none of the subregions is substantially occluded by an object, then each of the subregions is analyzed individually in the same manner.

In step 510, it is determined whether any direct child cell of the current cell is flooded with image blobs, that is, whether any children cell is substantially occluded by an object or objects. Specifically, the max child overlap module 840 is called which gets the blob overlap fraction (BlobOverlapFrac) for each of the 4 direct children cells and returns the greatest BlobOverlapFrac of the 4 children cells, called MaxChildOverlap. The value of MaxChildOverlap is compared with a flood threshold. If MaxChildOverlap is greater than the flood threshold, then it is declared that at least one of the children cells is flooded with image blobs. Also, in step 510, the parameter NumChildren for the current cell is checked to determine whether it is zero, indicating that the current cell is a cell in the lowest level.

If in step 510 neither NumChildren is zero nor MaxChildOverlap is greater than the flood threshold for the current cell, then the process continues to step 512, where the RetainStartTime parameter is set to the current time stamp value TS. Then, in step 514, the multi-resolution background update module 500 is called for each of the direct children cells of the current cell to analyze each children cell individually. This occurs because in step 510, it has been determined that the children cells of the current cell are not flooded by image blobs, thus each of the children cells of the current cell should be analyzed individually to determine background image information at a lower cell level, corresponding to a greater resolution.

On the other hand, if at least one of the children cells of the current cell is substantially flooded by image blobs, then processing continues at the level of the current cell and does not proceed to lower cell levels from or within the current cell. Specifically, in step 516, the BlobOverlapFrac for the entire current cell is compared with a blob threshold. The blob threshold is set to be rather small so that the cell is considered to have image blobs in it even if it is a small amount. In step 516, the image information for the current cell itself is analyzed to determine whether at least some part of the cell, such as 5% of it, is overlapped or covered by image blobs. In other words, in step 516, it is determined whether the cell is sufficiently (at least partially) occluded by an object or objects, which is to be distinguished from the test in step 510 that determines whether any children cell of the current cell is substantially (nearly completely) occluded by an object or objects.

One of two paths are taken depending on whether the current cell itself is determined to be at least partially overlapped by image blobs. In general, the presence of image blobs in a cell is an indication not to update the background image frame with image information for that cell since the image blobs in that cell occlude the view of the background. Under these circumstances, the background update would be deferred to a later time, when the object causing the image blob has moved out of the cell. Occasionally, however, an object will remain in the scene sufficiently long without any motion. This condition is detected and the background image frame is updated accordingly, as will be explained hereinafter,.

In step 518, it is determined whether NumChildren is zero for the current cell, that is, whether the current cell is in the lowest cell level. If it is not, then in step 520, the oldest child static scene time module 880 is called. This module checks the LastStaticSceneTime of all of the descendants of the current cell, and returns the oldest one of all of those times. The LastStaticSceneTime parameter for the current cell is assigned this value. By determining when any of its children cells were inactive, the last time that the current cell was inactive is accurately determined.

Turning to FIG. 8, the process continues from step 518 or step 520, to step 522 where the motion status module 700 is called to determine whether there is motion in the current cell. The motion status module 700 will be described in more detail hereinafter. It returns one of three values, MOTION, NO MOTION, or PENDING. If MOTION is the value returned by the motion status module 700, then no further analysis is performed on the current cell for the current background update cycle. The image information in the background image corresponding to the cell is maintained unchanged.

If the value returned is NO MOTION, this indicates that there has not been any motion detected in the cell for a sufficiently long period of time. Therefore, the next course of action to take in step 524 is to call the snap update module 820 and the update edges module 830 for the current cell. The snap update module updates the background image frame with image information for the current cell. In step 526, since it was determined that there was no activity in the current cell, the LastStaticSceneTime parameter for the cell is updated to the current time TS, and the child static time stamp update module 860 is called to do the same for all descendant cells of the current cell.

When the value returned from the motion status module 700 is PENDING, this indicates that there is an object or part of an object which is perhaps moving very slowly such that it cannot be determined that there is no motion in the cell. In step 528, it is determined whether an image blob is detected inside the current cell which has been moving for a very long period of time by comparing the difference of the current time stamp TS and the LastStaticSceneTime with a predetermined multiple of the RetentionThreshold (4 times the RetentionThreshold as an example). If the difference is greater than 4 times the RetentionThreshold, then in step 530, the slow update module 810 and the update edges module 830 are called. The slow update module 810 is called with the VSlowStepSize parameter in step 530 to gradually update the background image frame with image information for the current cell. The test of step 528 is made when a PENDING status is determined instead of a MOTION status because a slow update is less likely to incorrectly adapt the background image towards a moving object, and more likely to adapt the background image for static parts of a stationary scene undergoing some sort of regular motion. This is particularly useful when there is a slowly moving object in front of a stationary object, where it is desirable to account for the slowly moving object in the background image under certain conditions.

Referring to FIG. 9, when it is determined in step 516 that the current cell itself is not at least partially overlapped with blobs, the background image frame is updated based upon image information for the current cell. First, in step 532, the RetainStartTime for the cell is set to the current time TS and the same is done for all of the descendant cells of the current cell using the child time stamp update module 870. In addition, with the understanding that substantially no image blobs detected in the cell implies that there is no motion of an object in the cell, the LastStaticSceneTime is also set to the current time TS, for the current cell as well as all of its descendant cells using the child static time stamp update module 860 in step 534.

Next, in step 536, a check is made of the corresponding cell in the background difference frame. Even when no image blobs are in the scene within the current cell, there may be some differences that have informational value, such as shadowing, noise, or imperfect image blob segmentation. In step 536, BGDiffPixCount, the number of pixels that are different between the current cell and the corresponding cell in the background image frame is determined. In step 538, a fraction value BGDiffFrac is computed by dividing BGDiffPixCount by the total number of pixels in the cell (width×height of the cell). Then, in step 540, the fraction value BGDiffFrac is compared with a background difference threshold BGDiffrhreshold. If the BGDiffFrac is less than the BGDiffThreshold, this indicates that the background has not changed significantly, so in step 542, the snap update module 820 is called to update the image information for the current cell of the current frame into the background image frame, and the update edges module 830 is also called to update the edges information for that cell. If the BGDiffFrac is greater than the BGDiffThreshold, then since the difference can be due to noise, shadowing or imperfect image segmentation, in step 544, the slow update module 810 is called, preferably with the SlowStepSize parameter, to track fast changes in illumination. Also, the update edges module 830 is called in step 544. Alternatively, in step 542, the snap update and update edges modules are called only if the BGDiffFrac is greater than ½ of the BGDiffThreshold, thus reducing computation without significant change in performance.

Figure 11:
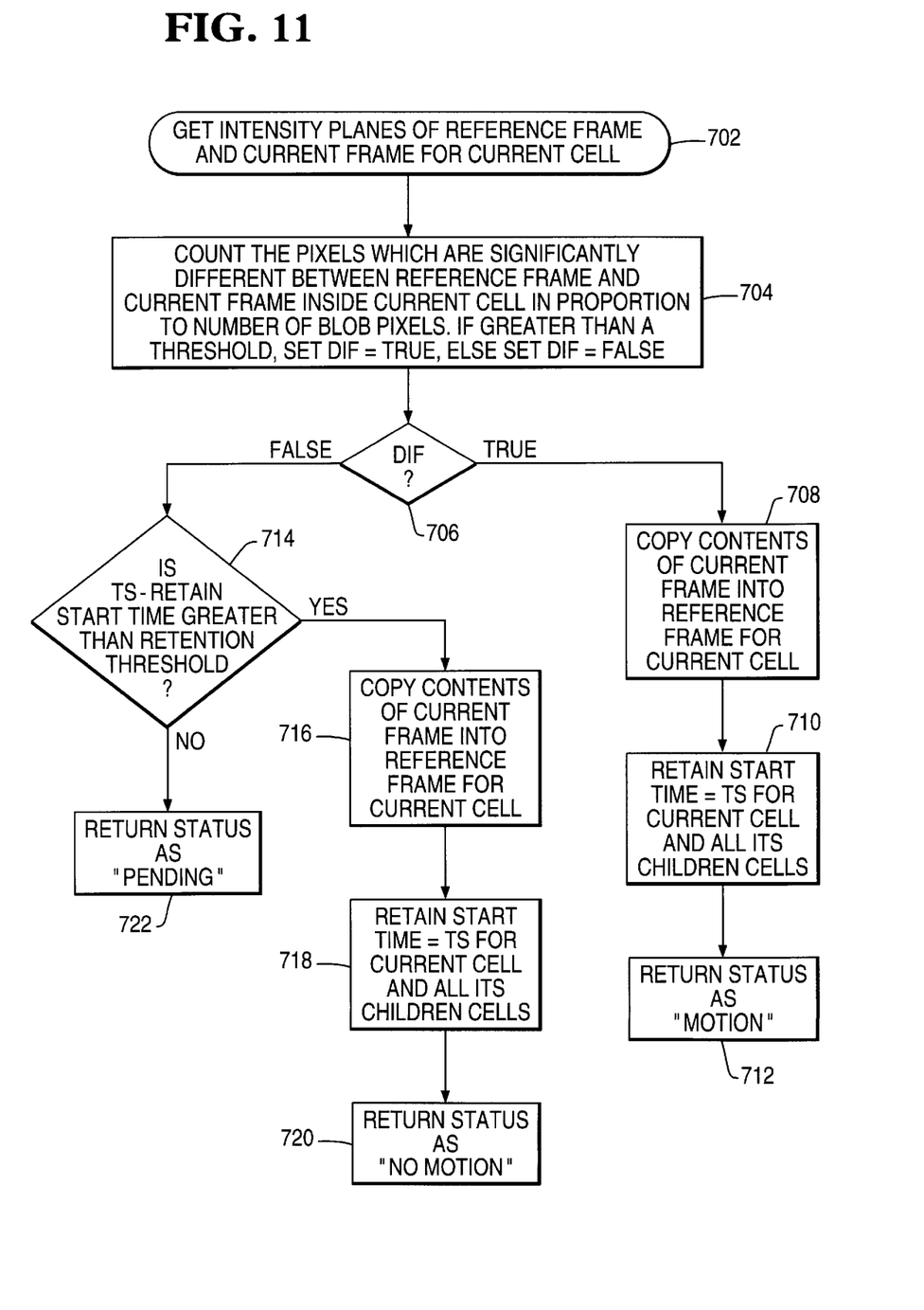
FIG. 11 is a flow chart showing the operation of the motion status module.

The motion status module 700 is described in greater detail with reference to FIG. 11. The motion status module is based upon historical information concerning motion status in a cell. This historical information is stored in a reference frame. That is, the reference frame stores image information for cells in which during a background cycle it is determined that motion has occurred or has not occurred. The image information in the reference frame is used in subsequent background update cycles to determine whether motion has occurred, has not occurred or is pending within the cell.

In a background update cycle, the motion status module begins by getting the intensity planes of the reference frame and the current frame for the current cell in step 702. The intensity planes comprise information representing the gray or monochromatic intensity information for a video frame. Next, in step 704, the intensity planes for the current frame and the reference frame are compared with each other within the current cell to count the number of pixels which are significantly different, that is, different by a predetermined amount represented by an amplitude threshold. Each corresponding pixel that is different between the reference frame and the current frame by a predetermined amount is counted as significantly different. The total number of different pixels is divided by NumBlobPixelsOverlap in the current cell. The result is compared with a percent threshold. If it is larger than the percent threshold, a quantity DIF is set to TRUE, and if it is not larger than the percent threshold, then DIF is set to FALSE. Other methods for setting DIF are also possible, including using color information.

When DIF is TRUE, this indicates that within the current cell, some motion has occurred since the reference frame contains the retained image from processing at the prior background update cycle. In step 708, the image information for the current cell in the current frame is copied into the corresponding cell of the reference frame. In step 710, the RetainStartTime parameter is set equal to the current time TS for the current cell and for its descendant cells. In step 712, the MOTION status is returned for use accordingly as shown in FIG. 8.

When DIF is FALSE, this indicates that the content of the current cell is not different between the current frame and reference frame. However, in step 714, a test is made to determine whether the scene inside the current cell has not changed for a predetermined period of time corresponding to a RetentionThreshold. If the difference between the current time stamp TS and RetainStartTime is longer than the RetentionThreshold, then it is determined that no motion has occurred within the current cell. Therefore, in step 716, the image information for the current cell in the current frame is copied into the corresponding cell of the reference frame. In step 718, the RetainStartTime parameter is updated to the current time stamp TS for the current cell, and all of its children. In step 720, the NO MOTION status is returned for use as shown in FIG. 8. The NO MOTION status indicates that there has not been any motion detected within the cell for a sufficiently long period of time.

If in step 714, it is determined that the difference between the current time stamp TS and the RetainStartTime is not greater than the RetentionThreshold, the PENDING status is returned in step 722, and no changes are made to the retention parameters for motion tests in subsequent cycles. The PENDING status indicates that there is an object (or portion thereof) in the cell that is moving very slowly such that it cannot be said that no motion occurred in the cell, or that it has experienced motion in the recent past but has started to show signs of stillness.

There are several parameters of the background adaptation system program which are user-programmable. These are:

EdgeThreshold Used by the update edges module.

PrctThreshold The percent threshold used by the motion status module to register a difference between corresponding cells in the current frame and reference frame.

AmpThreshold The amplitude threshold used in comparing pixels in the current frame with pixels in the reference frame for motion.

BlobOverlapThres Threshold used to determine if a cell has image blobs.

BGDiffhreshold Threshold for detecting noise or background difference inside a cell.

RetentionThreshold Time threshold (msec) for detecting a still object in a cell.

SceneChangeThresh Threshold for detecting a whole-scene change.

UpdatePeriod Period at which background adaptation is called (number of frames).

SlowStepRate Steps per second for slow adaptation in slow update module.

VSlowStepRate Steps per second for very slow adaptation in slow update module.

There are several advantages of the background adaptation system and method according to the present invention. Changing areas of a background image are updated while areas that are not changed are not affected (not updated). This process provides for a more effective local adaptation for those regions of the background image experiencing changes. In addition, slow-moving objects are distinguished from background entities, and the slow moving objects are not immediately captured as part of the background image. Moreover, the system and method according to the present invention detect significant changes in the scene, such as those caused by lighting changes, changes in the camera position or other environmental changes. The frequency of adaptation is adjustable to optimize the use of computation resources. It is possible to call the background adaptation process at intervals of video frames without a significant impact on performance.

The above description is intended by way of example only and is not intended to limit the present invention in any way except as set forth in the following claims.

What is claimed is:

1. A system for generating background image information of a scene comprising:
   (a) a video camera suitable for viewing the scene and generating video signals representing image information for the scene;
   (b) a frame grabber connected to the video camera for generating a stream of video frames, each video frame comprising image information for the scene at an instant of time; and
   (c) a processor connected to the frame grabber, the processor being programmed to update image information for a background image for the scene during a background update cycle based upon image information for a video frame, by:
      (i) selecting a region of the video frame;
      (ii) analyzing image information for smaller subregions within the region to determine whether any subregion is substantially occluded by an object;
      (iii) updating the background image based upon image information for the region if it is determined that any subregion within the region is substantially occluded by an object; and
      (iv) repeating steps (ii) and (iii) for each of the subregions when it is determined that the none of the subregions is substantially occluded by an object.

2. The system of claim 1, wherein the processor is further programmed to update the background image based upon image information for the region by:
   (v) determining whether image information for the region indicates that the region is sufficiently occluded by an object; and
   (vi) if it is determined that the region is sufficiently occluded by an object, then determining whether motion has occurred, has not occurred or is pending within the region with respect to image information for the region retained at a prior background update cycle.

3. The system of claim 2, wherein the processor is programmed to update the background image with image information for the region if it is determined that motion has not occurred within the region.

4. The system of claim 2, wherein the processor is programmed to maintain unchanged image information in the background image corresponding to the region if it is determined that motion has occurred within the region.

5. The system of claim 2, wherein the processor is programmed to gradually update the background image with image information for the region if it is determined that motion is pending within the region.

6. The system of claim 2, wherein the processor is programmed to update the background image when it is determined that the region is not sufficiently occluded by an object, by:
   (vii) determining a measure of difference between image information for the region in the video frame with image information for a corresponding region in the background image for a prior background update cycle;
   (viii) updating the background image with image information for the region if the measure of difference is less than a predetermined threshold; and
   (ix) gradually updating the background image with the image information for the region if the measure of difference is greater than the predetermined threshold.

7. The system of claim 2, wherein the processor is programmed to store image information in a reference frame for regions in which during a background update cycle it is determined that motion has occurred or has not occurred, and wherein the processor is programmed to determine whether motion has occurred, has not occurred, or is pending within the region based upon the reference frame by:
   (x) comparing image information for the region of the video frame with image information for a corresponding region in the reference frame;
   (xi) determining that motion has occurred within the region when there is a significant difference between image information for the region in the video frame and image information for the corresponding region in the reference frame;
   (xii) determining that motion has not occurred within the region when there is not a significant difference between image information for the region in the current video frame and image information for the corresponding region in the reference frame, and a period of time has elapsed since the reference frame was previously updated with image information for the region, which period of time is greater than a predetermined threshold; and
   (xiii) determining that motion is pending within the region when there is not a significant difference between image information for the region in the video frame and image information for the corresponding region in the reference frame, and the period of time which has elapsed since the reference frame was previously updated with image information for the region is not greater than the predetermined threshold.

8. The system of claim 1, and further comprising a memory, and wherein the processor is programmed to store image information representing the background image in the memory at each background update cycle.

9. The system of claim 1, wherein the processor is programmed to perform steps (i)–(iv) to update the background image for the scene at an update period of a predetermined number of video frames.

10. A system for generating background image information of a scene comprising:

(a) a video camera suitable for viewing a scene and generating video signals representing image information for the scene;
(b) a frame grabber connected to the video camera for generating a stream of video frames, each video frame comprising image information for the scene at an instant of time; and
(c) a processor connected to the frame grabber, the processor being programmed to update image information for a background image for the scene during a background update cycle based upon image information for a video frame, by:
(i) partitioning the video frame into a plurality of cell levels each comprising at least one cell, wherein the cells are arranged in a hierarchy from a highest cell level corresponding to an entire video frame and lowest cell level, each cell in a cell level except for the lowest cell level having a plurality of children cells at a next lower cell level which are subdivisions of it;
(ii) analyzing image information for each children cell of a cell to determine whether any children cell is substantially occluded by an object;
(iii) updating a background image based upon image information for the cell if it is determined than at least one children cell of the cell is substantially occluded by an object;
(iv) repeating steps (ii) and (iii) for each of the children cells when it is determined that none of the children cells is substantially occluded by an object.

11. The system of claim 10, wherein the processor is programmed to perform steps (ii)–(iii) beginning with the highest cell level and progressively for lower cell levels when it is determined that a lower cell level is not substantially occluded by an object.

12. The system of claim 10, wherein the processor is programmed to determine whether motion has occurred, has not occurred, or is pending within the cell with respect to image information for the cell retained at a prior background update cycle when it is determined that at least one children cell is substantially occluded by an object.

13. The system of claim 12, wherein the processor is programmed to update the background image with image information for the cell if it is determined that motion has not occurred within the cell.

14. The system of claim 12, wherein the processor is programmed to maintain unchanged image information in the background image for the cell if it is determined that motion has occurred within the cell.

15. The system of claim 12, wherein the processor is programmed to gradually update the background image with image information for the cell if it is determined that motion is pending within the cell.

16. The system of claim 12, wherein the processor is programmed to update the background image when it is determined that at least one of the children cells of the cell is substantially occluded by an object and the cell itself is not at least partially occluded by an object, by:
(v) determining a measure of difference between image information representing the cell in the video frame and image information for a corresponding cell in the background image;
(vi) updating the background image with image information for the cell if the measure of difference is less than a predetermined threshold; and
(vii) gradually updating the background image with the image information for the cell if the measure of difference is greater than the predetermined threshold.

17. The system of claim 12, wherein the processor is programmed to store image information in a reference frame for cells in which during a background update cycle it is determined that motion has occurred or has not occurred, and wherein the processor is programmed to determine whether motion has occurred within the cell, by:
(viii) comparing image information for the cell for the video frame with image information for a corresponding cell in the reference frame;
(ix) determining that motion has occurred within the cell when there is a significant difference between the image information for the cell in the video frame and image information for the corresponding cell in the reference frame;
(x) determining that motion has not occurred within the cell when there is not a significant difference between image information for the cell in the current video frame and image information for the corresponding cell in the reference frame, and a period of time has elapsed since the reference frame was previously updated with image information for the cell, which period of time is greater than a predetermined threshold since the cell was last processed, and storing image information for the cell in the reference frame; and
(xi) determining that motion is pending within the cell when there is not a significant difference between image information for the cell in the current video frame and image information for the corresponding cell in the reference image frame, and the period of time which has elapsed since the reference frame was previously updated with image information for the cell is not greater than the predetermined threshold since the cell was last processed.

18. The system of claim 10, and further comprising a memory, and wherein the processor is programmed to store image information representing the background image in the memory at each background update cycle.

19. The system of claim 10, wherein the processor is programmed to perform steps (i)–(iv) to update the background image for the scene at an update period of a predetermined number of video frames.

20. A method for updating image information for a background image of a scene monitored by a video camera from which is generated a stream of video frames, each comprising image information of the scene at an instant of time, the background image being updated during a background update cycle based upon image information for a video frame, comprising steps of:
(a) selecting a region of the video frame;
(b) analyzing image information for at least one smaller subregion within the region to determine whether the at least one smaller subregion is substantially occluded by an object;
(c) updating a background image based upon image information for the region if it is determined that the at least one subregion within the region is substantially occluded by an object; and
(d) repeating steps (b) and (c) for each of a plurality of smaller subregions within the region when it is determined that the at least one subregion is not substantially occluded by an object.

21. The method of claim 20, wherein the step of updating the background image based upon image information for the region comprises steps of:
(e) determining whether image information for the region indicates that the region is sufficiently occluded by an object;

(f) if it is determined that the region is sufficiently occluded by an object, then determining whether motion has occurred, has not occurred or is pending within the region with respect to image information for the region retained at a prior background update cycle.

22. The method of claim 21, wherein the step of updating the background image comprises updating the background image with image information for the region if it is determined that motion has not occurred within the region.

23. The method of claim 21, wherein the step of updating the background image comprises maintaining unchanged image information in the background image corresponding to the region if it is determined that motion has occurred within the region.

24. The method of claim 21, wherein the step of updating the background image comprises gradually updating the background image with image information for the region if it is determined that motion is pending within the region.

25. The method of claim 21, wherein the step of updating the background image when it is determined that the region is not sufficiently occluded by an object comprises:

(g) determining a measure of difference between image information for the region in the video frame and image information for a corresponding region in the background image;

(h) updating the background image with image information for the region if the measure of difference is less than a predetermined threshold; and (i) gradually updating the background image with the image information for the region if the measure of difference is greater than the predetermined threshold.

26. The method of claim 21, and further comprising the step of storing image information in a reference frame for regions in which during a background update cycle it is determined that motion has occurred or has not occurred, and wherein the step of determining whether motion has occurred within the region comprises steps of:

j) comparing image information for the region of the video frame with image information for the corresponding region in the reference frame;

(k) determining that motion has occurred within the region when there is a significant difference between image information for the region in the current video frame and image information for the corresponding region in the reference frame;

(l) determining that motion has not occurred within the region when there is not a significant difference between image information for the region in the current video frame and image information for the corresponding region in the reference frame, and a period of time has elapsed since the reference frame was previously updated with image information for the region, which period of time is greater than a predetermined threshold; and (m) determining that motion is pending within the region when there is not a significant difference between image information for the region in the current video frame and image information for the corresponding region in the reference frame, and the period of time which has elapsed since the reference frame was previously updated with image information for the region is not greater than the predetermined threshold.

27. The method of claim 20, and further comprising a step of storing image information for the background image at each background update cycle.

28. The method of claim 20, wherein steps (a)–(d) are performed to update the background image for the scene at an update period of a predetermined number of video frames.

29. A computer-readable medium storing executable instructions which cause a computer to generate image information for a background image of a scene during a background update cycle based upon a video frame representing image information for the scene at an instant of time, by:

(a) selecting a region of the video frame;

(b) analyzing image information for smaller subregions within the region to determine whether any subregion is substantially occluded by an object;

(c) updating a background image based upon image information for the region if it is determined that any subregion of the region is substantially occluded by an object; and (d) repeating steps (b) and (c) for each of the subregions when it is determined that none of the subregions is substantially occluded by an object.

30. The computer-readable medium of claim 29, wherein the executable instructions for updating the background image comprises executable instructions for:

(e) determining whether image information for the region indicates that the region is sufficiently occluded by an object;

(f) if it is determined that the region is sufficiently occluded by an object, then determining whether motion has occurred, has not occurred, or is pending within the region with respect to image information for the region retained at a prior background update cycle.

31. The computer-readable medium of claim 30, wherein the executable instructions for updating the background image if it is determined that motion has not occurred within the region comprises executable instructions for updating the background image with image information for the region.

32. The computer-readable medium of claim 30, wherein the executable instructions for updating the background image if it is determined that motion has occurred within the region comprises executable instructions for maintaining unchanged image information in the background image corresponding to the region.

33. The computer-readable medium of claim 30, wherein the executable instructions for updating the background image if it is determined that motion is pending within the region comprises executable instructions gradually updating the background image with image information for the region.

34. The computer-readable medium of claim 30, wherein the executable instructions for updating the background image when it is determined that the region is not sufficiently occluded by an object comprises executable instructions for:

(g) determining a measure of difference between image information for the region in the video frame and image information for a corresponding region in the background image;

(h) updating the background image with image information for the region if the measure of difference is less than a predetermined threshold; and (i) gradually updating the background image with image information for the region if the measure of difference is greater than the predetermined threshold.

35. The computer-readable medium of claim 30, and further comprising executable instructions for storing image information in a reference frame for regions in which during a background update cycle it is determined that motion has occurred or has not occurred, and wherein the executable instructions for performing the step of determining whether motion has occurred, has not occurred or is pending within a region comprises executable instructions for:

(j) comparing image information for the region of the video frame with image information for the corresponding region in the reference frame;

(k) determining that motion has occurred within the region when there is a significant difference between image information for the region in the video frame and image information for the corresponding region in the reference;

(l) determining that motion has not occurred within the region when there is not a significant difference between image information for the region in the video frame and image information for the corresponding region in the reference frame, and a period of time has elapsed since the reference frame was previously updated with image information for the region, which period of time is greater than a predetermined threshold; and (m) determining that motion is pending within the region when there is not a significant difference between image information for the region in the video frame and image information for the corresponding region in the reference frame, and the period of time which has elapsed since the reference frame was previously updated with image information for the region is not greater than the predetermined threshold.

36. The computer-readable medium of claim 29, and further comprising executable instructions for causing image information for the background image to be stored in a memory at each background update cycle.

37. The computer-readable medium of claim 29, and further comprising executable instructions for causing steps (a)–(d) to be performed to update the background image for the scene at an update period of a predetermined number of video frames.

* * * * *